F. H. Manny.
Mower.
N° 29,800. Patented Aug 28, 1860.

Witnesses
Augustus Pohlers.
Wm B. Dayton.

Fredk H. Manny
by his Attorney
Wm D. Baldwin

UNITED STATES PATENT OFFICE.

FREDERICK H. MANNY, OF ROCKFORD, ILLINOIS.

IMPROVEMENT IN HARVESTERS.

Specification forming part of Letters Patent No. 29,800, dated August 28, 1860.

*To all whom it may concern:*

Be it known that I, FREDERICK H. MANNY, of Rockford, in the county of Winnebago and State of Illinois, have invented certain new and useful Improvements in Harvesters, of which the following is a full, clear, and exact description, reference being had to the accompanying drawings, which make part of this specification, and in which—

Figure 1:
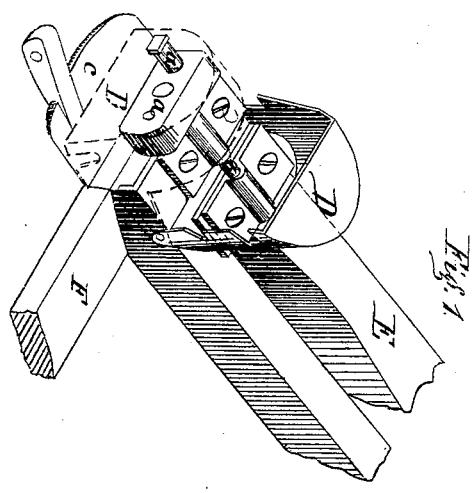
Figure 3:
Figure 2:

Figure 1 represents a view in perspective of a portion of the gearing-frame of a harvesting-machine embracing my improvements, the black lines showing the cap or bonnet which covers the crank and balance-wheel, when said cap is raised, to permit the sickle to be drawn out, and the red lines showing the same when lowered to its place to protect the crank and balance-wheel from grass, leaves, &c. Fig. 2 represents a modified form of a segment-shaped balance-plate, and Fig. 3 represents a modified form of shield-plate to protect the crank and balance-wheel.

In that class of harvesters in which reciprocating cutters are employed, (which class constitutes by far the greater portion of the machines now used,) a balance-wheel upon the crank-shaft which operates the cutters has become almost universal, owing to the steadiness of the motion it imparts. In some of these machines, however—such, for instance, as that known as the "J. H. Manny machine"—the use of such a balance-wheel is attended with very great inconvenience, owing to the fact the arrangement of the mechanism of the aforesaid machines being such that the crank works so close to the frame of the machine that if a balance-wheel were employed the sickle could not be removed from the guard-fingers without first removing the balance-wheel, and consequently the crank-shaft; and as the sickle must necessarily be taken out many times in a season to sharpen it, replace broken sections, &c., the inconvenience attendant thereupon has proved so serious as to prevent the general use of balance-wheels in such machines. When this evil is attempted to be remedied by the employment of a segment-shaped balance-plate, which admits of the ready removal of the sickle, another evil is engendered—viz., that caused by the liability of the grass to wind around the balance-plate and crank, and thus to interrupt the proper action of the cutting apparatus.

It is the object of my invention to obviate this latter objection; and to this end my improvement consists in arranging a cap, bonnet, or guard-plate upon the frame in such manner that it may rest upon the shoe above which the balance-plate revolves and protect the latter from the grass, leaves, &c., while it may also readily be removed, when desired, to permit the sickle to be drawn out from between the guard-fingers.

In the accompanying drawings, a balance-plate, *a*, (formed in this instance by removing a segment of a circle from two sides of an ordinary balance-wheel,) is represented as secured upon a crank-shaft, *b*, turning in bearings on the gearing-frame E.

A wrist-pin, *a*, to which the pitman-rod that reciprocates the sickle is secured, is inserted into the balance-plate, the throw of said crank being adjusted by means of a series of holes in the plate at different distances from its axis of rotation. The balance-plate, it will be observed, is so arranged as to rotate very nearly in contact with the shoe *c*, which is fastened to the finger-beam F, and to which one fork of the tongue is pivoted.

A cap or bonnet, D, is pivoted to the gearing-frame in such manner that it may readily be lowered so as to cover the balance-plate, or raised so as to be out of the way when required. When the sickle is to be removed the balance-plate is turned to the position shown in Fig. 1 of the drawings and the pitman-rod removed from the wrist-pin. The sickle can then readily be drawn out endwise between the balance-plate and the shoe *c*.

Fig. 2 represents a modified form of the balance-plate with only one portion or segment removed.

I have found by experience that by far the greater portion of the matter which winds round the balance-plate is drawn in at the outer end of the frame, or that farthest removed from the cutters, as it is at this point that the grass previously cut is liable to gather.

A simple plate, D, like that shown in Fig. 3, would therefore answer a very good purpose if placed at that side of the balance-plate.

What I claim as my invention, and desire to secure by Letters Patent, is—

The arrangement of the hinged cap or bonnet D and shoe C in relation to each other and to the mechanism operating the cutter of the harvester, substantially as and for the purpose described.

In testimony whereof I have hereunto subscribed my name.

FREDERICK H. MANNY.

Witnesses:
    JOHN P. MANNY,
    W. C. BLINN.